United States Patent
Petton et al.

(10) Patent No.: US 9,644,097 B2
(45) Date of Patent: May 9, 2017

(54) STABILIZER POLYMERIZATION PROCESS AND PROCESS FOR MAKING POLYMER POLYOLS

(75) Inventors: Lionel Petton, Ledeberg (BE); Hanno R. Van der Wal, Hoek (NL); Freddy Van Damme, Bruges (BE); Edwin Mes, Philippine (NL); Fillip E. Du Prez, Ghent (BE); Sam Verbrugghe, Oostakker (BE); Jean-Paul Masy, Destelbergen (BE)

(73) Assignee: Dow Global Technologies LLC, Midland, MI (US)

( * ) Notice: Subject to any disclaimer, the term of this patent is extended or adjusted under 35 U.S.C. 154(b) by 366 days.

(21) Appl. No.: 14/114,092

(22) PCT Filed: Apr. 22, 2012

(86) PCT No.: PCT/US2012/034602
§ 371 (c)(1),
(2), (4) Date: Oct. 25, 2013

(87) PCT Pub. No.: WO2012/154393
PCT Pub. Date: Nov. 15, 2012

(65) Prior Publication Data
US 2014/0058037 A1    Feb. 27, 2014

Related U.S. Application Data

(60) Provisional application No. 61/485,265, filed on May 12, 2011.

(51) Int. Cl.
| | |
|---|---|
| C08L 29/10 | (2006.01) |
| C08F 293/00 | (2006.01) |
| C08F 257/02 | (2006.01) |
| C08L 71/02 | (2006.01) |
| C08G 18/08 | (2006.01) |
| C08G 18/63 | (2006.01) |
| C08L 75/04 | (2006.01) |
| C08L 25/04 | (2006.01) |

(52) U.S. Cl.
CPC .......... *C08L 71/02* (2013.01); *C08G 18/0876* (2013.01); *C08G 18/636* (2013.01); *C08L 75/04* (2013.01); *C08F 257/02* (2013.01); *C08F 293/005* (2013.01); *C08L 25/04* (2013.01); *C08L 29/10* (2013.01)

(58) Field of Classification Search
CPC .......... C08L 71/02; C08L 75/04; C08L 25/04; C08L 25/06; C08L 25/08; C08L 29/10; C08G 18/0876; C08G 18/636; C08G 18/633; C08G 18/635; C08F 257/02; C08F 293/005; C08F 216/1416
USPC ........ 525/242, 259, 261, 267; 524/377, 386, 524/387, 388, 394
See application file for complete search history.

(56) References Cited

U.S. PATENT DOCUMENTS

| | | | | |
|---|---|---|---|---|
| 4,242,249 | A * | 12/1980 | Van Cleve | ........... C08G 18/632 252/384 |
| 4,513,124 | A | 4/1985 | Hoffman | |
| 4,588,830 | A | 5/1986 | Fisk | |
| 4,640,935 | A | 2/1987 | Fisk | |
| 4,745,153 | A | 5/1988 | Hoffman | |
| 5,081,180 | A | 1/1992 | Bourguignon | |
| 5,364,908 | A | 11/1994 | Oishi | |
| 5,854,386 | A | 12/1998 | Shen | |
| 6,512,024 | B1 | 1/2003 | Lundgard | |
| 6,613,827 | B2 | 9/2003 | Lundgard | |
| 2005/0085613 | A1 | 4/2005 | Adkins | |
| 2011/0213044 | A1 * | 9/2011 | Van der wal | ...... C08G 18/0876 521/88 |

FOREIGN PATENT DOCUMENTS

| | | |
|---|---|---|
| EP | 1675885 B | 3/2008 |
| WO | 2009/097234 A | 8/2009 |
| WO | 2009/155427 A | 12/2009 |
| WO | WO 2009/155427 A2 * | 12/2009 |

* cited by examiner

*Primary Examiner* — Roberto Rabago
(74) *Attorney, Agent, or Firm* — Gary C Cohn PLLC (57) ABSTRACT

A polymeric stabilizer is produced by copolymerizing an unsaturated polyether with an unsaturated low molecular weight monomer in a controlled radical polymerization. The polymeric stabilizer is useful for producing polymer polyol products via a mechanical dispersion process or an in situ polymerization process.

14 Claims, 2 Drawing Sheets

STABILIZER POLYMERIZATION PROCESS AND PROCESS FOR MAKING POLYMER POLYOLS

This application claims priority from U.S. Provisional Application No. 61/485,265, filed 12 May 2011.

This invention relates to methods for making dispersions of polymer particles in a polyol and to methods for making stabilizers useful in such dispersions.

"Polymer polyols" (sometimes known as "copolymer polyols") are widely used raw materials for manufacturing flexible polyurethane foam, and other polyurethane products. They have a continuous phase made up of one or more compounds having multiple hydroxyl groups (i.e., a "polyol") into which another polymer is dispersed in the form of small particles. The dispersed polymer particles help to form open cells and to increase the load-bearing of polyurethane foam that is made with the polymer polyol.

The conventional way of manufacturing polymer polyols is by polymerizing the disperse phase polymer directly within the continuous polyol phase ("in situ" polymerization).

Styrene-acrylonitrile copolymers often form the dispersed phase of these polymer polyol products. The widespread use of styrene-acrylonitrile copolymers is due to several factors. Styrene-acrylonitrile copolymer particles have suitable mechanical and thermal properties. Styrene and acrylonitrile readily copolymerize in a free-radical polymerization at moderate temperatures and pressures, and thus are easily polymerized within a liquid polyol phase. The acrylonitrile is understood to graft to the polyol during the polymerization process. This grafting is believed to be important in forming a stable dispersion. Although styrene homopolymer particles can be formed in a polyol phase, the resulting polymer polyols tend to have poor stability.

Stability is an important characteristic of polymer polyols. The dispersed phase must remain distributed within the polyol phase for extended periods as the polymer polyol is stored, transported and used. In addition, polymer polyol products often experience large swings in temperature during storage and transportation, and must remain stable across the entire temperature range. If the dispersion is unstable, some or all of the dispersed polymer phase can settle out. This leads to fouling of transportation, storage and processing equipment, inconsistencies in the polymer polyol product and inconsistencies in polyurethanes made from the polymer polyol.

Stability is improved through the use of stabilizers. Useful stabilizers fall into two main types. One type is a polyol compound in which one or more of the hydroxyl groups are capped with a group that contains polymerizable unsaturation. The polyol compound typically contains long chains (having weights of, for example, 200 to 12,000 g/mole or more) that are highly soluble in the continuous phase of the polymer polyol. This type of stabilizer copolymerizes with styrene and acrylonitrile, and in doing so introduces polyol-soluble moieties onto the copolymer particles. These polyol-soluble moieties lead to improved particle stability. In the usual case, in which the polyol phase is a polyether polyol, these polyol-soluble moieties are typically polyether chains. Examples of stabilizers of this type are described, for example, in U.S. Pat. No. 4,513,124, U.S. Pat. No. 4,588,830, U.S. Pat. No. 4,640,935 and U.S. Pat. No. 5,854,386.

A second type of stabilizer is a polymeric stabilizer having long-chain pendant groups that are soluble in the continuous phase. Again, the pendant groups are typically polyether chains that have weights from 200 to 12,000 or more, in the usual case in which the polyol phase is a polyether polyol. The polymeric stabilizer can be formed by homopolymerizing a capped polyol compound that contains polymerizable unsaturation, or, more commonly, by copolymerizing such a capped polyol compound with one or more other unsaturated monomers. These polymeric stabilizers typically have molecular weights in the range of 30,000 to several hundred thousand grams/mole, and may contain from 1 to 20 or more pendant chains that are soluble in the polyol phase of the dispersion. Polymeric stabilizers of this type are described, for example, in U.S. Pat. No. 4,745,153, U.S. Pat. No. 5,081,180, U.S. Pat. No. 6,613,827, EP 1 675 885 and WO 2909/155427.

Figure 1:
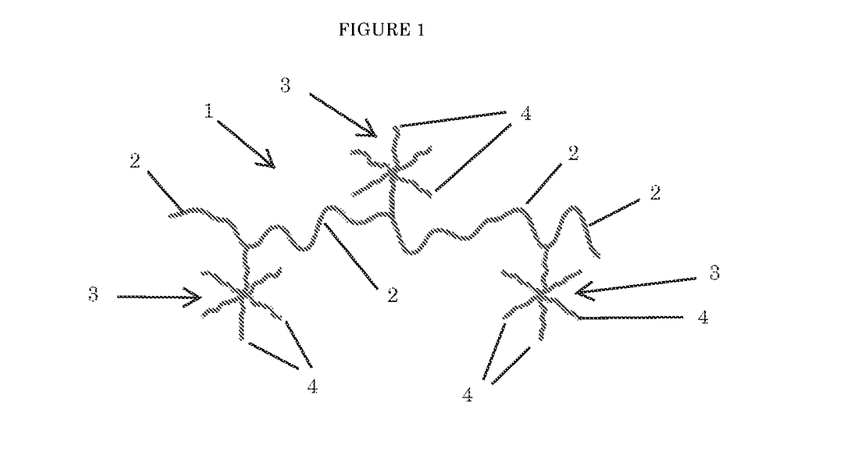
FIG. 1 is a representation of the structure of a "star-grafted" stabilizer.

The second type of polymeric stabilizers are often represented as having "comb" structures, in which the polymer chain formed by polymerizing or copolymerizing the unsaturated groups form a backbone and long-chain pendant polyether groups form the "teeth" of the comb. If the long-chain pendant groups are branched, as described in WO 2009/155427, the polymeric stabilizer can be visualized as having an idealized structure such as shown in FIG. 1. However, the actual structure of the polymeric stabilizer tends to deviate quite significantly from the theoretical structures. The polymeric stabilizers tend to have high polydispersities, and contain large fractions of molecules in which there are few or none of the desired pendant groups.

Recently, there have been attempts to manufacture polymer polyols through a mechanical dispersion process instead of the conventional in situ polymerization method. Such an approach is described, for example, in U.S. Pat. No. 6,613,827 and WO 2009/155427. In the mechanical dispersion approach, the disperse phase polymer is polymerized separately, and is dispersed in the polyol phase by melting the polymer and blending the molten polymer with the polyol under high shear conditions to break the molten polymer into fine droplets which are then cooled to form the disperse phase particles.

The mechanical dispersion approach potentially offers several advantages over the in situ polymerization process. The in situ polymerization process tends to form a significant fraction of low molecular weight oligomeric species that become solubilized in the polyol phase. These oligomers increase product viscosity, which can lead to handling and mixing problems when the polymer polyol is used. Products made via the in situ polymerization route often contain volatiles such as residual monomers and decomposition products of the free radical initiators and/or chain transfer agents that are used in the polymerization. The presence of these materials requires additional stripping steps to be performed in order to remove them, which increases production cost. Residual volatile materials nonetheless tend to remain in the product, contributing to odor and other issues. A mechanical dispersion process allows one to avoid introducing such oligomers and volatiles into the dispersion. Another potential advantage of a mechanical dispersion process is that the molecular weight of the dispersed polymer is fixed through selection of the starting materials. Manufacturing costs potentially can be reduced because the disperse phase polymer can be produced inexpensively in a large-scale bulk or solution polymerization process.

There remains the problem of forming a stable dispersion. The problem is somewhat exacerbated because the mechanical dispersion process does not present an opportunity for grafting to occur between the disperse phase polymer and the polyol phase, as typically occurs during an in situ polymerization. Additionally, the mechanism of dispersion is different, as are the demands on the stabilizer. In a mechanical dispersion, the stabilizer molecules must rapidly find their way onto the surface of the disperse phase polymer droplets as they form, and facilitate the initial stabilization of the molten polymer droplets as well as the longer-term stabilization of the product dispersion. This initial stabilization must take place in a matter of seconds in any practical mechanical dispersion process. Effective initial stabilization produces small dispersed phase particles, which in turn leads to superior long-term stability due to the lower mass and higher surface area-to-weight ratio of the individual particles. Effective stabilization also leads to low product viscosities.

Since there is no opportunity for polymerization in the mechanical dispersion process, the stabilizers in this case have been of the polymeric type. U.S. Pat. No. 6,613,827 describes a stabilizer made in the reaction of a monoamine polyol with a maleic anhydride functionalized polyethylene wax. The structure of this stabilizer is given as:

WO 2009/155427 describes stabilizers which are a copolymer of (1) from 10 to 70% by weight of a branched polyol which has a molecular weight from 4000 to 20,000, from 0.2 to about 1.2 polymerizable ethylenically unsaturated groups per molecule and from about 3 to about 8 hydroxyl groups per molecule with (2) from 30 to 90% by weight of styrene or a mixture of styrene and one or more other low molecular weight monomers. The copolymeric stabilizers are made in a free-radical polymerization process. These stabilizers theoretically have structures as depicted by FIG. 1, but in reality the stabilizers obtained this way have large variability in their structures, and contain large fractions of polymers that do not have pendant polyether groups. The polymers lacking pendant polyether groups are ineffective as dispersion stabilizers.

What is desired is a stabilizer that more effectively stabilizes a dispersion of polymer particles in a polyether phase, to produce a low viscosity product having small dispersed particles. It is especially desirable that the stabilizer works well in a mechanical dispersion process to produce a dispersion having good stability, a small particle size and a low product viscosity.

In one aspect, this invention is a process for making a polymer polyol, comprising forming a dispersion of solid polymer particles in the presence of a continuous liquid polyol phase and a stabilizer copolymer produced by copolymerizing an unsaturated polyether which has a molecular weight from 2000 to 20,000 and from 0.2 to about 1 polymerizable unsaturated groups per molecule with one or more copolymerizable low molecular weight unsaturated monomers in a controlled radical polymerization to form a stabilizer copolymer having a number average molecular weight from 30,000 to 500,000 and an average of 1 to 20 pendant polyether chains per molecule.

In this process, the stabilizer polymer or copolymer facilitates the production of polymer polyol products having low viscosities and desirably small dispersed phase particles. The excellent results obtained from this process are believed to be due in part to the lower polydispersities and relatively homogeneous compositions of the stabilizers, compared to previous stabilizers made in a conventional free radical process, with fewer polymeric materials being formed that are devoid of pendant polyether chains.

Figure 2:
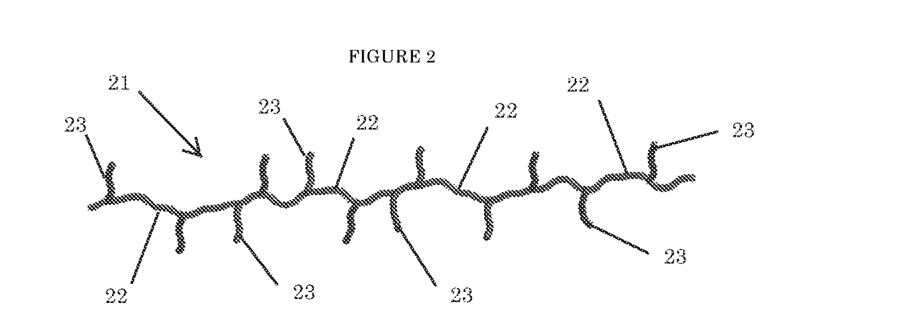
FIG. 2 is a representation of the structure of a "comb" stabilizer.
Figure 3:
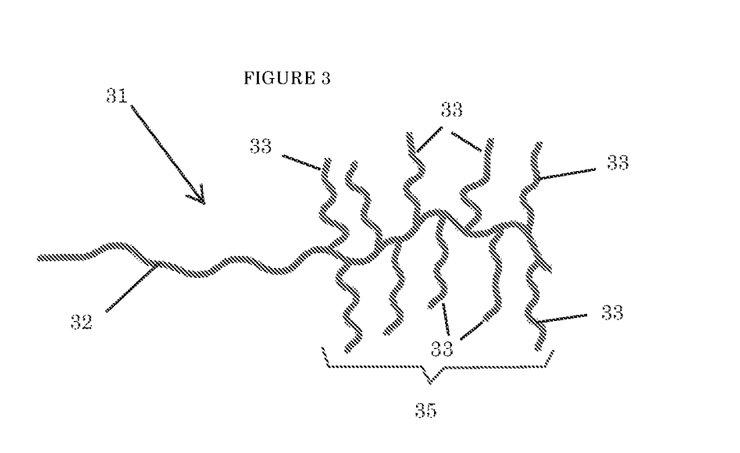
FIG. 3 is a representation of the structure of a "toothbrush" stabilizer.
Figure 4:
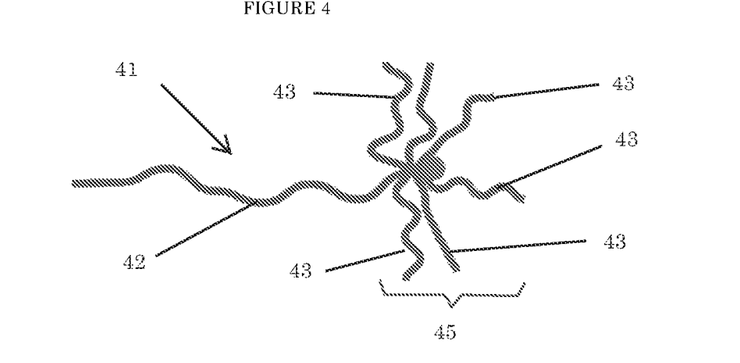
FIG. 4 is a representation of the structure of a "palm tree" stabilizer.

The stabilizer copolymers produced in the controlled radical mediation polymerization can have various structures, including a star-grafted copolymer structure such as shown in FIG. 1 or a "comb" structure as shown in FIG. 2. In preferred embodiments, the stabilizer has a "toothbrush" structure as shown in FIG. 3 or a "palm tree" structure as shown in FIG. 4. A stabilizer having a toothbrush or palm-tree structure is a block copolymer that includes a first block having a molecular weight of at least 18,000, and preferably up to 400,000, that is devoid of pendant polyether groups. The block copolymer also includes a second block which is a homopolymer of an unsaturated polyether which has a molecular weight from 2000 to 20,000 and from 0.2 to about 1.0 polymerizable unsaturated groups per molecule or a copolymer of said unsaturated polyether with one or more copolymerizable low molecular weight unsaturated monomers. The second block contains from 2 to 20 pendant polyether groups that each has a molecular weight from 2000 to 20,000.

In some embodiments, the dispersion is formed in a melt dispersion process which includes the steps of (a) mixing a melted thermoplastic polymer with the liquid polyol in the presence of the stabilizer under conditions sufficient to disperse the melted thermoplastic polymer in the form of droplets within a continuous phase of the liquid polyol and (b) cooling the dispersed polymer droplets in the polyol to solidify the polymer droplets and form the polymer polyol. In other embodiments, the dispersion is formed in an in situ polymerization process which includes the steps of polymerizing one or more low molecular weight monomers in the presence of the continuous polyol phase and the stabilizer under conditions such that the low molecular weight monomer(s) polymerize to form polymer particles dispersed in the continuous polyol phase.

In some embodiments, the invention is a process for making a polymer polyol comprising forming a dispersion of solid polymer particles in the presence of a continuous liquid polyol phase and a stabilizer block copolymer having a first block having a molecular weight of at least 18,000 and which is devoid of pendant polyether groups and a second block which is a homopolymer of a branched or linear unsaturated polyether which has a molecular weight from 2000 to 20,000 and from 0.2 to about 1 polymerizable unsaturated group per molecule or a copolymer of said unsaturated polyether with one or more copolymerizable low molecular weight unsaturated monomers, the second block containing from 2 to 20 pendant branched or linear polyether groups that each have a molecular weight from 2000 to 20,000.

The invention is also a polymer polyol comprising a continuous polyol phase, a disperse phase of polymer particles and a stabilizer copolymer, which polymer polyol is produced in accordance with any of the foregoing aspects or embodiments of the invention.

The stabilizer is a copolymer of an unsaturated polyether with one or more low molecular weight monomers. The unsaturated polyether is characterized in having a molecular weight from 2000 to 12,000, preferably at least 4000. Polyether molecular weights are conveniently determined by end-group analysis methods such as ATDM D4274-11. This polyether contains at least 1, preferably up to about 8, hydroxyl groups per molecule and at least one polymerizable unsaturated group per molecule. The unsaturated polyether preferably does not contain, on average, more than 1 polymerizable unsaturated group per molecule. By "unsaturated group", it is meant a carbon-carbon double or triple bond, such as a vinyl or substituted vinyl group.

The unsaturated polyether can be prepared in either of two main methods. One method can be generally described as forming a linear or branched polyether having a molecular weight from 2000 to 20,000 and from 1 to 9, preferably from 2 to 9, hydroxyl groups per molecule, and "capping" one or more of the hydroxyl groups with an unsaturated capping agent. The capping agent includes, in addition to the polymerizable unsaturation, a functional group that can react with a hydroxyl group of the polyether (or a corresponding alkoxide ion) to form a covalent bond to the polyether. The capping agent may be, for example, an ethylenically unsaturated isocyanate compound such as 3-isopropenyl-α,α-dimethylbenzylisocyanate (TMI) or isocyanatoethylmethacrylate (IEM), an ethylenically unsaturated halide such as vinyl benzyl chloride, and ethylenically unsaturated siloxane such as vinyltrimethoxylsilane, or an ethylenically unsaturated epoxide compound.

The capping agent and the starting polyether preferably are reacted in a ratio of about 0.05 to about 1.0 mole, preferably from 0.25 to 0.9 mole, more preferably from 0.4 to 0.8 mole, of capping agent per mole of starting polyether. Higher capping levels can lead to the formation of significant numbers of molecules that have two or more polymerizable unsaturated groups, which in turn can lead to crosslinking when the unsaturated polyether is subsequently polymerized to form a stabilizer. Lower amounts of capping agent lead to an excessively large proportion of the starting polyether molecules remaining uncapped and thus unable to polymerize. The product of the capping reaction is a linear or branched, unsaturated polyether, which in most cases will be mixed with some amount of uncapped species that do not contain polymerizable unsaturation. The uncapped species may constitute from 0 to 95, preferably from 0 to 70 and still more preferably from 0 to 30 weight percent of the mixture. A small amount of species containing two or more polymerizable unsaturated groups may also be formed. It is usually not necessary to separate the singly-capped species from the uncapped species or those species which contain more than one capping groups. As some of the hydroxyl groups are consumed in the capping reaction, this product contains somewhat fewer hydroxyl groups per molecule than does the starting polyether. The average number of hydroxyl groups per molecule is estimated by subtracting the number of moles of capping agent per mole of starting polyether from the nominal functionality of the starting polyether.

An alternative route to making the unsaturated polyether is to alkoxylate an ethylenically unsaturated compound having oxyalkylatable groups. Examples of such ethylenically unsaturated compounds include ethylenically unsaturated alcohols, thiols or amines. Synthetic routes of this type are described, for example, in U.S. Pat. No. 5,854,396 and in EP 1 675 885 B1. This route is best adapted for producing linear polyethers, although it is possible to produce branching by including a branching agent such as glycidol in the alkoxylation reaction. Generally the branching agent is introduced early in the alkoxylation reaction, and the alkoxylation reaction is then continued without adding more of the branching agent. This produces longer-chain branches into the polyether portion of the molecule.

The unsaturated polyether, if linear, preferably has a molecular weight from 2000 to 15,000, and if branched preferably has a molecular weight from 5000 to 16,000. If branched, the unsaturated polyether may contain two or more branches each having a molecular weight of at least 500, more preferably of at least 1000, and preferably up to 6000, especially up to 4000. The polyether may be a polymer of ethylene oxide, propylene oxide, 1,2-butylene oxide, tetramethylene oxide, styrene oxide, or other polymerizable alkylene oxide, or a copolymer of any two or more thereof. The unsaturated polyether may contain one or more hydroxyl groups, and preferably contains up to eight hydroxyl groups.

The unsaturated polyether is copolymerized with one or more low molecular weight monomers to form a stabilizer copolymer. A "low molecular weight" monomer, for purposes of this invention, is one having a molecular weight of no greater than 500, preferably no greater than 150. The low molecular weight monomer should have only one ethylenically unsaturated group per molecule, to prevent crosslinking in the stabilizer. A preferred low molecular weight monomer is styrene, although other vinyl aromatic monomers such as acrylate esters, methacrylate esters, acrylonitrile and the like are suitable. The amount of low molecular weight monomer may range from, for example 0.1 to 10 parts by weight per part by weight of the unsaturated polyether, and more preferably from 1 to 5 parts by weight per part by weight of the unsaturated polyether.

The unsaturated polyether is in some embodiments copolymerized in a controlled radical polymerization. A "controlled radical polymerization" is a living free-radical polymerization process characterized in that a dynamic equilibrium between propagating radicals and dormant species is established, allowing radicals to become reversibly trapped. Various types of controlled radical polymerizations are known including, for example, cobalt-mediated radical polymerization (CMPR), stable free radical mediated polymerization (SFRMP) (including, for example, a nitroxide-mediated polymerization (NMP)), atom transfer radical polymerization (ATRP) and reversible addition fragmentation chain transfer (RAFT). Preferred processes are the RAFT and nitroxide-mediated polymerization processes.

A nitroxide-mediated polymerization, for purposes of this invention, is a radical polymerization performed in the presence of a free radical initiator and nitroxide radicals. The nitroxide radical is characterized in having an oxygen atom singly bonded to a secondary aliphatic nitrogen atom (i.e., a nitrogen atom bonded to two aliphatic carbon atoms in addition to the nitroxide oxygen). Suitable nitroxide radicals can be represented by the general structure I:

wherein each $R^1$ group is independently an alkyl or substituted alkyl group provided that the $R^1$ groups together may form an aliphatic ring structure that includes the nitrogen atom within an aliphatic ring structure.

At least one of the $R^1$ groups preferably is bound to the nitrogen atom through a tertiary carbon atom (i.e., a carbon atom bonded to three other carbon atoms in addition to the nitrogen atom). Both of the $R^1$ groups may be bound to the nitrogen atom through tertiary carbon atoms.

The $R^1$ groups may contain various substituent groups, including aryl, hydroxyl, ether, nitrile, keto, phosphono, carboxy, amino and halogen (especially fluorine and/or chlorine) groups and the like.

Many useful nitroxide radicals are stable and can be supplied in the form of the free radical. Examples of suitable nitroxide radicals include, for example:

tempo

SG1

2,2,5-trimethyl-4-phenyl-3-azahexane-3-nitroxide

Additional nitroxide radicals that can be used include those described by Hawker et al., "New Polymer Synthesis by Nitroxide Mediated Living Radical Polymerizations", *Chem. Rev.* 2001, 101, 3661-3668.

The NMP process is performed in the presence of a free radical initiator in addition to the nitroxide radical. Suitable free radical initiators include peroxy compounds or azo compounds that decompose or otherwise react under the conditions of the polymerization reaction to generate radicals. Preferred free radical initiators should decompose rapidly under the polymerization conditions to produce free radicals that are totally consumed within a few minutes. Suitable peroxy type initiators include peroxides, peresters, percarbonates and the like. Specific examples of free radical initiators include azobis(isobutyronitrile), t-butyl peroxydiethylacetate, t-amyl peroxy-2-ethylhexanoate, 2,5-dimethyl-2,5-di(t-butylperoxy) hexane and the like.

Certain alkoxyamines that dissociate to form nitroxide radicals under the conditions of the polymerization reaction also can be used as the source for the nitroxide radical. These materials also function as the free radical initiator. Suitable alkoxyamines include those represented by structure II:

(II)

wherein each $R^1$ is independently as described with respect to structure I, and $R^2$ is alkyl or substituted alkyl. The $R^2$ group may in some cases be bonded to the nitroxide oxygen atom through a tertiary carbon atom or an allylic carbon (i.e., one alpha to a vinyl or substituted vinyl group). The $R^2$ group may be aryl-substituted. Examples of alkoxyamine compounds that can be used as a source of nitroxide radicals include those having the structures:

2,2,6,6,-tetramethyl-1-(1-phenylethoxy)piperidine

1-[1-(4-Chloromethylphenyl)ethoxy]-2,2,6,6-tetramethylpiperidine

MAMA-SG1

N-tert-Butyl-N-(2-methyl-1-phenylpropyl)-O-(1-phenylethyl) hydroxylamine

-continued

NOR Regulator

Other suitable alkoxyamines include those described by Ma et al., *Chemical Engineering Society* 58 (2003) 1177-1190, and by Bartsch et al., *Macromol. Rapid Commun.* 2003, 24, 614.

The nitroxide radical is typically provided in the polymerization in small amounts such as from 0.0005 to 0.1, preferably from 0.0001 to 0.01 moles of nitroxide radical per mole of monomers (including the unsaturated polyether and the low molecular weight monomer(s)). The amount of free radical initiator, if present, is generally at least 0.05, preferably at least 0.1, and more preferably at least 0.5 moles or at least 0.8 moles per mole of the nitroxide radical. Up to 5 moles of the free radical initiator may be used per mole of the nitroxide radical, but it is preferred to use up to 1.5 moles, more preferred to use up to 1.1 moles and still more preferred to use up to 1 mole of the free radical initiator per mole of the nitroxide radical. When the molar amount of free radical initiator exceeds that of the nitroxide radical, one tends to obtain faster kinetics at the expense of lower control over the structure of the stabilizer molecule. Conversely, molar amounts of free radical initiator less than the nitroxide radical tend to provide slower kinetics but better control over the stabilizer structure. It is often preferred to provide approximately equal molar amounts of the free radical initiator and the nitroxide radical.

A RAFT polymerization is performed in the presence of a thiocarbonylthio compound and a free radical initiator. A thiocarbonylthio compound contains at least one —S—(C=S)— group. Dithioesters, thiocarbamates and xanthates are all examples of suitable types of thiocarbonylthio compounds. S-1-dodecyl-S'-($\alpha,\alpha$'-dimethyl-$\alpha$"-acetic acid)trithiocarbonate (DDMAT) is a specific example of a suitable thiocarbonylthio compound. Other suitable thiocarbonylthio compounds are described by Barunecker et al., "Controlled/living radical polymerization: features, developments, and perspectives", *Prog. Polym. Sci.* 32 (2007) 93-146.

The copolymerization of the unsaturated polyether can be performed in bulk, but may instead be performed as a mixture or dispersion in a carrier. The carrier may constitute up to about 80%, preferably from about 20 to 80% and more preferably from about 50 to 80%, of the combined weight of the carrier and the monomers. The carrier material may include, for example, an uncapped portion of the polyether that is used as a starting material to form the unsaturated polyether, and/or another polyol. As already mentioned, the unsaturated polyether may contain some quantity of the starting polyether due to incomplete capping. Alternatively or in addition, more of this polyether or another polyether can be added during the polymerization step, to help reduce viscosity and/or solvate the stabilizer copolymer. If another polyol is used as all or part of the carrier, it may have a hydroxyl equivalent weight from 31 to 3,000 or more, and may have from 2 to 8 or more hydroxyl groups per molecule. It should be miscible with the unsaturated polyether. A preferred polyol carrier material (other than the starting polyether) is a polyether polyol having a hydroxyl equivalent weight from 300 to 2,000.

Alternatively or in addition, the carrier may include one or more low molecular weight compounds having a molecular weight of about 250 or less, which are not polyethers, and which are solvents for the low molecular weight monomer(s). Suitable carriers of this type include aromatic hydrocarbons such as toluene or xylene, aliphatic hydrocarbons such as hexane, monoalcohols such as ethanol and isopropanol, and ketones such as acetone. Preferred solvents for NMP polymerizations have boiling temperatures (at atmospheric pressure) of at least 100° C., more preferably at least 120° C.

If a low molecular weight non-polyether is used as all or part of the carrier, it should be removed before, during or after the time that the stabilizer copolymer is used to make the polymer polyol. Similarly, residual monomers and other volatile polymerization by-products can be removed from the stabilizer polymer or copolymer before, during or after the polymer polyol is prepared. These materials can be removed by subjecting the stabilizer polymer or copolymer or the polymer polyol to reduced pressures and/or elevated temperatures, or by various other stripping methods.

The copolymerization can be performed at an elevated temperature such as from 80 to 180° C. and preferably from 110 to 150° C. Conditions for performing controlled free radical polymerizations of ethylenically unsaturated monomers are well known in the art. Polymerization is continued until a copolymer having a molecular weight as described before is attained. Conversion of the unsaturated polyether is often less than 100% and so the stabilizer polymer or copolymer obtained from the polymerization typically contains a quantity of unpolymerized unsaturated polyether. This may be left in the stabilizer if desired, when the stabilizer copolymer is subsequently used to produce a polymer polyol. An advantage of certain embodiments of this invention is that conversion of the unsaturated polyether tends to be higher than when conventional free radical polymerizations are performed. This leads to a product having less residual monomeric unsaturated polyether and lower polydispersity.

Copolymerizations can be performed in various ways, leading to various copolymer structures.

In some embodiments, the unsaturated polyether is randomly polymerized with the low molecular weight monomer(s). A random polymerization can be used to produce polymers having structures such as shown in FIGS. 1 and 2.

Turning to FIG. 1, stabilizer copolymer 1 includes blocks 2 of polymerized low molecular weight monomer and pendant polyether chains 3, which correspond to points at which the unsaturated polyether has become incorporated into the polymer chain. A stabilizer copolymer of the type illustrated in FIG. 1 is a copolymer of one or more low molecular weight monomer(s) and a branched unsaturated polyether. Blocks 2 each may contain as few as one monomer unit formed by polymerizing a low molecular weight monomer, or as many as 10,000 or more such monomer units. The various blocks 2 may be of different lengths. In the embodiment shown in FIG. 1, three pendant polyether chains 3 are shown, but as a few as one or as many as 20 such pendant polyether chains 3 may be present. The pendant polyether chains 3 are generally randomly distributed along the length of stabilizer copolymer 1, although there may be some gradient in the structure. In FIG. 1, pendant chains 3 are branched, with some of the individual branches being indicated by reference numerals 4. Branches 4 preferably each have a molecular weight of at least 500, more preferably at least 1000, up to about 12,000, more preferably up to about 6000. The number of branches shown in FIG. 1 has been selected arbitrarily for purposes of illustration, and fewer or a greater number of branches may be present. The branches 4 illustrated in FIG. 1 are shown as emanating from at or near a single point. This, too, is not necessary, and branching may instead occur at any number of points in any pendant polyether chain 3. Pendant polyether chains 3 have molecular weights of at least 2000 to as much as 20,000, and preferably from 4,000 to 16,000.

If the unsaturated polyether is linear, it typically forms a random copolymer having a structure as represented in FIG. 2. In FIG. 2, stabilizer copolymer 21 includes blocks 22 of polymerized low molecular weight monomer and pendant polyether chains 23, which correspond to points at which the unsaturated polyether has become incorporated into the polymer chain. Each of blocks 22 may contain as few as one monomer unit formed by polymerizing a low molecular weight monomer, or as many as 10,000 or more such monomer units. The various blocks 22 may be of different lengths. As before, an arbitrary number of pendant polyether chains 23 are shown in FIG. 3. As few as one or as many as 20 such pendant polyether chains 23 may be present. Pendant polyether chains 23 have molecular weights of at least 2000 to as much as 20,000, and preferably from 4,000 to 15,000.

A copolymerization may instead be performed by a) first polymerizing one or more low molecular weight unsaturated monomers in a controlled radical polymerization to form a living polymeric macroinitiator having a molecular weight of at least 18,000 and preferably up to 400,000 and then b) copolymerizing the living polymeric macroinitiator formed in step a) with the unsaturated polyether, or a mixture of the unsaturated polyether and one or more additional low molecular weight monomers. The order of steps a) and b) can also be reversed to form the stabilizer copolymer. This copolymerization method can be used to prepare "toothbrush" type stabilizer copolymers such as depicted in FIG. 3 and "palm tree" structures as depicted in FIG. 4.

Macroinitiator molecular weights, as well as molecular weights of the stabilizer as a whole and of other polymers, are conveniently measured by gel permeation chromatography against a polystyrene standard.

Turning to FIG. 3, "toothbrush"-type stabilizer copolymer 31 includes block 32, which represents a block having a molecular weight of at least 18,000 that is devoid of pendant polyether groups. Block 32 may have a weight of up to about 400,000. Block 32 is formed in a first polymerization step in which one or more low molecular weight monomers are polymerized in a controlled radical polymerization in the absence of an unsaturated polyether to produce a living macroinitiator. Block 35 contains pendant polyether chains 33, and also contains repeating units that do not have such pendant polyether chains. Block 33 is formed by copolymerizing the unsaturated polyether with one or more low molecular weight monomers in the presence of the living macroinitiator. In the embodiment shown, pendant polyether chains 33 are linear, but they may be branched instead. The molecular weights of pendant polyether chains are as described before. An arbitrary number of pendant polyether chains are shown in FIG. 3. As few as 2 or as many as 20 such pendant polyether chains may be present. The molecular weight of block 35 may be from 10,000 to 250,000.

In FIG. 4, "palm tree"-type stabilizer copolymer 41 includes block 42 that represents a block having a number average molecular weight of at least 18,000 that is devoid of pendant polyether groups. Block 42 may have a weight of up to 400,000. Block 42 is formed in a first polymerization step in which one or more low molecular weight monomers are polymerized in a controlled radical polymerization in the absence of an unsaturated polyether to produce a living macroinitiator. Block 45 contains pendant polyether chains 43. Block 43 is formed by homopolymerizing the unsaturated polyether in the presence of the living macroinitiator. As shown, pendant polyether chains 43 are linear, but they may be branched instead. The molecular weights of pendant polyether chains are as described before. An arbitrary number of pendant polyether chains are shown in FIG. 4, but as few as 2 or as many as 20 such pendant polyether chains may be present. The molecular weight of block 45 may be from 6,000 to 250,000 g/mole.

The product of the copolymerization of the unsaturated polyether will be in most cases a mixture of materials. The product often will contain some proportion of polymer molecules that contain no pendant polyether groups. This proportion is preferably no more than 30%, more preferably no more than 20% of the total weight of the total weight of polymerized product. In addition, the product may contain polyether molecules that were not capped during the capping reaction, or other carrier as may have been present during the copolymerization. Carriers having a molecular weight of 500 or less preferably are removed from the product.

A polymer polyol can be made using the stabilizer copolymer via a mechanical dispersion process or via an in situ polymerization.

A mechanical dispersion process is performed by melting a thermoplastic polymer and dispersing the molten thermoplastic polymer into a liquid polyol in the presence of the stabilizer copolymer. The conditions are sufficient to disperse the thermoplastic polymer in the form of droplets within a continuous phase of the liquid polyol. The dispersion is then cooled to solidify the thermoplastic polymer droplets to form particles.

Suitable apparatus and mechanical dispersion methods for making the polymer polyol are described, for example, in U.S. Pat. No. 6,613,827. The apparatus can be any device in which the molten thermoplastic polymer can be sheared into droplets in the presence of the polyol and then maintained under agitation or shear until the dispersed droplets can be cooled and solidified. A preferred apparatus is an extruder. The method can be carried out batch-wise, continuously or semi-continuously.

In a preferred process, the melted thermoplastic polymer is first mixed with the stabilizer, or a mixture of the stabilizer and a portion of the polyol(s), in a first mixing section of an extruder. The thermoplastic polymer may be melted in the first mixing section of the extruder, or in an upstream section of the extruder. Alternatively, the thermoplastic polymer may be fed into the extruder as a molten material. In the latter case, the molten thermoplastic polymer may be fed into the extruder through an injection port, a hopper or similar feeding apparatus that can handle a viscous fluid. In preferred embodiments, the thermoplastic polymer is melted in a first extruder, and the melt is fed into the barrel of a second extruder where it is used to form the polymer polyol.

By "extruder", it is meant a device having an elongated barrel, an outlet at or near one end of the barrel, mixing elements within the elongated barrel, and a means for pushing a liquid or molten material as essentially a plug flow through the mixing elements, to and out of the outlet. Most typically, the extruder will have one or more longitudinal, rotating screws located within the barrel. The screw or screws are typically designed to perform both the pushing and mixing functions, although it is possible that the screw(s) perform only one or the other of these functions, and some other apparatus performs the other. For example, an extruder barrel can include one or more screws designed to push the materials though static mixing elements, where the mixing function is performed. However, the most preferred device is a single- or twin-screw extruder in which the screw or screws include mixing elements.

In the preferred process, the extruder contains at least one injection port within or upstream of the first mixing section. The stabilizer copolymer or mixture thereof in a polyol is introduced into the extruder at the injection port or ports, and is mixed with the molten thermoplastic polymer in the first mixing section. It is possible to preblend the thermoplastic polymer with the stabilizer or stabilizer/polyol mixture, and introduce the blend into the first mixing section where they are mixed as described below.

In the preferred process, the thermoplastic polymer should constitute at least about 35% by weight of the mixture formed in the first mixing section. It is more preferred that the thermoplastic polymer constitutes from about 50 to 90% weight percent of the mixture formed in the first mixing section. The stabilizer copolymer, plus any carrier as may be present, may constitute from 1 to 35 weight %, preferably from 5 to 25 weight % of the mixture. Any polyol added in this section preferably should not constitute more than about 25% of the weight of the mixture.

In the preferred process, the proportions of the components in the first mixing section typically result in the formation of a continuous phase of the thermoplastic polymer. The stabilizer may be partially or entirely dissolved in the thermoplastic polymer, or may be dispersed as droplets within the thermoplastic polymer. If polyol is present in the first mixing section, it tends to form droplets dispersed in the thermoplastic phase, in which case the stabilizer molecules tend to concentrate at the boundaries of the polyol and thermoplastic polymer phases. Mixing conditions in the first mixing section are therefore chosen to disperse the stabilizer (and polyol if used) into the molten thermoplastic polymer.

The temperature of the mixture in the first mixing section is high enough so that the thermoplastic polymer remains melted. Most thermoplastic polymers are amorphous, and the process temperature in that case is generally above the glass transition temperature, and preferably at least 15° C., more preferably at least 25° C., above the glass transition temperature.

It is often advantageous to use as high a temperature as possible in the first mixing section, consistent with the thermal stability of the various materials, to reduce the melt viscosity of the thermoplastic polymer. Temperature conditions that result in significant degradation of the materials are to be avoided. The necessary temperatures in any given case will of course depend on the particular starting materials that are used. It is usually preferable to avoid using a temperature in excess of 80° C. above the crystalline melting or glass transition temperature of the thermoplastic polymer.

It is preferred to preheat the stabilizer copolymer (and any polyol that may be mixed with the stabilizer or otherwise introduced into the first mixing section), before introducing it into the first mixing section, to a temperature at or near the temperature that is desired in the first mixing section. This helps to prevent localized cool spots and to prevent the melted thermoplastic polymer from solidifying locally.

In the preferred process, the resulting mixture of thermoplastic polymer, stabilizer and liquid polyol (if any) is then conveyed to a second mixing section, where it is combined with polyol to form a polymer polyol. Additional stabilizer polymer or copolymer may be added in this step if desired. "Conveyed" in this context means simply that the mixture is moved downstream in the extruder to a zone where the second mixing step is performed. This is typically performed through the normal operation of the extruder screw or screws, which move the material forward through the extruder in plug flow fashion.

Mixing ratios in the second mixing step are generally such that the polymer polyol formed there contains from about 1 to about 70% by weight, preferably from 15 to 60% by weight, and more preferably from about 20 to 55% by weight of dispersed droplets of the thermoplastic polymer. The stabilizer copolymer (including any carrier as may be present) may constitute from 1 to 15 weight percent, preferably from 2 to 10 weight percent, and even more preferably from 4 to 7 weight percent of the polymer polyol. The liquid polyol phase may constitute from 40 to 98 weight percent of the polymer polyol. Preferably, the polyol phase constitutes from 33 to 80% of the weight of the polymer polyol.

In the second mixing section, the thermoplastic polymer is formed into droplets that become dispersed in a continuous phase of the liquid polyol. The stabilizer copolymer will reside mainly at or near the interface between the polyol phase and the thermoplastic polymer droplets.

The mixture is subjected to sufficient shear in the second mixing section to disperse the thermoplastic polymer into discrete droplets of the desired size. Generally, the thermoplastic polymer is formed into droplets from about 100 nanometers to 100 microns in diameter. A preferred minimum particle size is at least 250 nanometers. A preferred maximum particle size is 20 microns. An especially preferred particle size is from 500 nanometers to 20 microns. Particle size is conveniently measured according to ASTM D1921.

The temperature conditions in the second mixing section are in general as described with respect to the first mixing section. The temperatures are not necessarily identical in the two mixing sections, but they may be. As before, it is preferred to pre-heat the liquid polyol before adding it into the second mixing section, to prevent localized cooling and premature solidification of the thermoplastic polymer particles.

The use of the terms "first" and "second" mixing sections are used here only to indicate the relative order of these sections in the preferred process. The description of the mixing sections as "first" and "second" is not intended to exclude the possibility of other mixing steps being performed in the process. It is also possible that either or both of the mixing steps as described can be conducted in a series of two or more distinct sub-steps, in a series of two or more distinct mixing sections of the extruder, or even in multiple devices.

Because the polyol is in most cases a relatively low viscosity material, it is usually necessary to maintain a back-pressure in the extruder to prevent the polyol phase from running out of the extruder before the thermoplastic polymer becomes dispersed. The pressure is maintained at 500 kPa or higher, particularly (in the preferred process) in the second mixing section. A preferred pressure is at least 1000 kPa. Pressures in excess of 5000 kPa are generally not necessary and provide little if any additional advantage. A pressure of up to 3000 kPa is more preferred. The pressure in the first mixing section of the preferred process is generally less important, although in most cases the pressure there will be the same as or very close to that of the second mixing section.

Because the extruder operates in essentially a plug flow mode, a convenient way of controlling the pressure in the second mixing section (and the extruder as a whole), is to provide a region of restricted flow downstream of the second mixing section. The region of restricted flow is conveniently located at or near the outlet end of the extruder. The "outlet end" is the portion of the extruder downstream from the second mixing section, through which the polymer polyol product is removed from the extruder.

The region of restricted flow can be generally described as a small cross-section region through which the polymer polyol must flow to be removed from the extruder. The small cross-section limits the rate at which the polymer polyol can flow through at a given pressure. The restriction of flow at this point creates a back-pressure upstream in the second mixing section and in most cases the entire extruder. This pressure is a result of the action of the screws or other motive force pushing the materials through the extruder, against the restriction formed by the small cross-section region. Actual pressures of course will be a function of the cross-section of the region, the viscosity of the polymer polyol, and the applied force.

A preferred apparatus for restricting the flow of the polymer polyol is a back pressure regulator. These back pressure regulators include a conduit or conduits having a variable cross-section. They operate by adjusting the cross-sectional area of the conduit or conduits such that a predetermined pressure is maintained upstream of the back pressure regulator. Many devices of this type are commercially available, including those sold by Fluid Control Systems, Inc., Spartanburg, S.C. under the tradename GO Regulators. The preferred back pressure regulator can be adjusted to provide a predetermined back pressure in the second mixing section (and other portions of the extruder, if desired), and have a high pressure release mechanism which allows excess pressures to be relieved if a predetermined maximum pressure is exceeded.

After the thermoplastic polymer has been dispersed into the polyol, the resulting polymer polyol is cooled enough to solidify the dispersed thermoplastic polymer droplets to form particles. The polymer polyol should be agitated until the particles have solidified, to prevent agglomeration and/or fouling of equipment. The size of the resulting particles will be very close to that of the droplets before they are cooled, although there may be some small differences due to thermal expansion or contraction or due to a phase change in the case of a crystalline or semi-crystalline polymer. The cooling step can be performed within the extruder or after the polymer polyol is discharged from the extruder. If the polymer polyol is cooled within the extruder, it is preferred to cool it before it reaches the region of restricted flow. This can reduce or prevent fouling of the equipment in that region of the apparatus, and prevent or reduce particle agglomeration from occurring there. Alternatively, the cooling can be done after the polymer polyol is discharged from the extruder, such as passing it through a co- or counter-flow heat exchanger. It is also possible to cool the polymer polyol in a mixing vessel operated at a low temperature in order to quench the discharge from the extruder.

The polymer polyol so produced may be treated to remove volatiles, reaction by-products, unreacted monomers and other impurities. If the stabilizer contained a solvent that was not previously removed, the solvent can be removed from the polymer polyol product at this stage. This is conveniently done by subjecting the polymer polyol to an elevated temperature and/or a reduced pressure. Temperatures should not be so high as to melt or soften the dispersed particles of the thermoplastic polymer.

It is also possible to devolatilize the polymer polyol in a decompression zone of the extruder, before or after the cooling step.

In situ polymerizations are conveniently performed in the presence of the stabilizer copolymer using methods such as are described, for example, in U.S. Pat. No. 4,513,124, U.S. Pat. No. 4,588,830, U.S. Pat. No. 4,640,935, U.S. Pat. No. 5,854,386, U.S. Pat. No. 4,745,153, U.S. Pat. No. 5,081,180, U.S. Pat. No. 6,613,827 and EP 1 675 885. As before, polymer polyols made via an in situ polymerization may contain from about 1 to about 70% by weight, preferably from 15 to 60% by weight, and more preferably from about 20 to 55% by weight of dispersed particles of the thermoplastic polymer. The stabilizer copolymer (including any carrier as may be present) may constitute from 1 to 15 weight percent, preferably from 2 to 10 weight percent, and even more preferably from 4 to 7 weight percent of the polymer polyol. The liquid polyol phase may constitute from 40 to 98 weight percent of the polymer polyol and preferably constitutes from 33 to 80% of the weight of the polymer polyol. The size of the dispersed thermoplastic polymer particles may be from about 100 nanometers to 100 microns in diameter, with a preferred minimum particle size being at least 250 nanometers, a preferred maximum particle size being 20 microns and an especially preferred particle size being from 500 nanometers to 20 microns.

The polyol that forms the continuous phase in the polymer polyol product is an organic material or mixture of organic materials that is a liquid at room temperature (25° C.) and which contains an average of at least 1.5 isocyanate-reactive groups per molecule. For purposes of this invention, the term "polyol" is used as a shorthand term for such materials, even though the actual isocyanate-reactive groups in a particular case may not necessarily be hydroxyl groups. The liquid polyol preferably contains an average of 1.8 to 8 isocyanate-reactive groups/molecule, especially from 2 to 4 such groups. The isocyanate-reactive groups are preferably aliphatic hydroxyl, aromatic hydroxyl, primary amino and/or secondary amino groups. Hydroxyl groups are preferred. Hydroxyl groups are preferably primary or secondary hydroxyl groups.

The equivalent weight of the polyol per isocyanate-reactive groups will depend on the intended applications. Polyols having an equivalent weight of 400 or greater, such as from 400 to 3000, are preferred for forming elastomeric polyurethanes such as slabstock or molded polyurethane foams, microcellular polyurethane elastomers and non-cellular polyurethane elastomers. Lower equivalent weight polyols, such as those having an equivalent weight of 31 to 399, are preferred for making rigid polyurethane foams and structural polyurethanes.

Preferred types of liquid polyol(s) include polyether polyols, polyester polyols, and various types of polyols that are prepared from vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers; random copolymers of propylene oxide and ethylene oxide in which the poly(ethylene oxide) content is, for example, from about 1 to about 30% by weight; ethylene oxide-capped poly(propylene oxide) polymers; and ethylene oxide-capped random copolymers of propylene oxide and ethylene oxide. The polyether polyols may contain low levels of terminal unsaturation (for example, less that 0.02 meq/g or less than 0.01 meq/g). Examples of such low unsaturation polyether polyols include those made using so-called double metal cyanide (DMC) catalysts, as described for example in U.S. Pat. Nos. 3,278,457, 3,278, 458, 3,278,459, 3,404,109, 3,427,256, 3,427,334, 3,427,335, 5,470,813 and 5,627,120. Polyester polyols typically contain about 2 hydroxyl groups per molecule and have an equivalent weight per hydroxyl group from about 400 to 1500.

Suitable polyesters include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

Suitable polyols prepared from vegetable oils and animal fats include for example, hydroxymethyl group-containing polyols as described in WO 04/096882 and WO 04/096883; castor oil, so-called "blown" vegetable oils, and polyols prepared by reacting a vegetable oil with an alkanolamine (such as triethanolamine) to form a mixture of monoglycerides, diglycerides, and reaction products of the fatty acid amides, which are ethoxylated to increase reactivity and to provide a somewhat more hydrophilic character. Materials of the last type are described, for example in GB1248919.

Suitable low equivalent weight polyols include materials containing from 2 to 8, especially from 2 to 6 hydroxyl, primary amine or secondary amine groups per molecule and having an equivalent weight from 30 to about 200, especially from 50 to 125. Examples of such materials include diethanol amine, monoethanol amine, triethanol amine, mono- di- or tri(isopropanol) amine, glycerine, trimethylol propane, pentaerythritol, sorbitol, ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene.

The polymer(s) that make up the dispersed polymer particles should be soluble in the continuous phase polyol to the extent of no more than 2% (i.e., 2 grams of thermoplastic polymer in 100 grams of the polyol). The solubility is more preferably no greater than 1% and even more preferably no more than 0.5%. These polymer(s) preferably are non-dispersing, meaning that the polymer(s) do not form a stable dispersion in the polyol phase in the absence of a stabilizer.

The polymer(s) that make up the dispersed polymer particles is a solid at room temperature. It should not melt, soften or thermally degrade at temperature of 80° C. or less, preferably 110° C. or less and more preferably 130° C. or less. However, if the polymer polyol is to be made in a melt dispersion process, these polymer(s) must melt or soften enough to be processable at some temperature at which the polyol is liquid and at which the polyol does not thermally degrade. This temperature is preferably no greater than 250° C. and more preferably no greater than 210° C.

The molecular weight of the disperse phase polymer is not especially critical, except that, when the polyol is made in a melt dispersion process, the disperse phase polymer has the desired melting or softening temperature, and that the melted or softened polymer has a viscosity, at a temperature suitable for making the polymer polyol, that permits the polymer to be dispersed into droplets 100 microns or smaller in diameter. The disperse phase polymer may have a melt flow index from 1 to 20 decigrams/minute, when measured according to ASTM D-1238 at 200° C. under a 5 kg applied load.

A wide range of polymers may be used as the disperse phase, including, for example, various polyolefins (such as polymers and copolymers of ethylene), various polyesters, various polyamides, various polycarbonates, various polymers and copolymers of acrylic and/or methacrylic esters, and the like.

The thermoplastic polymer may be a homopolymer or copolymer of styrene. If a copolymer, polymerized styrene may constitute at least 25%, preferably at least 50%, more preferably at least 75% and especially from 85 to 100% of the weight of the polymer. The polymerized comonomer(s) (if any), (1) are copolymerizable with styrene in block or random fashion, (2) preferably are not highly polar or hydrophilic, and (3) should not be reactive with an alcohol, primary or second amine, or isocyanate group, under the conditions at which the polymer polyol is produced, or under the conditions of a reaction of the polymer polyol with a polyisocyanate to form a polyurethane and/or polyurea polymer. Examples of suitable comonomers include, for example, acrylonitrile, butadiene, methyl methacrylate, butyl acrylate, vinyl acetate and the like.

The polymer polyol is useful to make a wide variety of polyurethane and/or polyurea products. The polyurethane and/or polyurea products will be in most instances elastomeric materials that may be non-cellular, microcellular or foamed. Polyurethanes are typically prepared by reacting the polymer polyol or dispersion with a polyisocyanate. The polymer polyol product may be blended with one or more additional polyols, including those types described above, to adjust the solids content to a desired level or provide particular characteristics to the polyurethane. The reaction with the polyisocyanate is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the polymer polyol of the invention can be used in the same manner as conventional polymer polyol materials, using the same general types of processes as are used with the conventional materials.

Suitable polyisocyanates include aromatic, cycloaliphatic and aliphatic isocyanate. Exemplary polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl) cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2, 4'-diisocyanate, PMDI, toluene-2,4-diisocyanate, toluene-2, 6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate used in making a polyurethane is commonly expressed in terms of isocyanate index, i.e., 100 times the ratio of NCO groups to isocyanate-reactive groups in the reaction mixture (including those provided by water if used as a blowing agent). In general, the isocyanate index may range as low as 60 and as high as 500 or more. However, for the production of conventional slabstock foam, the isocyanate index typically ranges from about 95 to 140, especially from about 105 to 115. In molded and high resiliency slabstock foam, the isocyanate index typically ranges from about 50 to about 150, especially from about 85 to about 110.

A catalyst is often used to promote the polyurethane-forming reaction. The selection of a particular catalyst package may vary somewhat with the particular application, the particular polymer polyol or dispersion that is used, and the other ingredients in the formulation. The catalyst may catalyze the "gelling" reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane-forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used.

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Organotin catalysts tend to be strong gelling catalysts, so they are preferably used in small amounts, especially in high resiliency foam formulations. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2.5 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process. Carbon dioxide can also be used as a liquid or as a supercritical fluid.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and polymer polyol in the presence of the blowing agent, surfactant, catalyst(s) and other optional ingredients as desired, under conditions such that the polyisocyanate and polyol react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

The following examples are provided to illustrate the invention, but are not intended to limit the scope thereof. All parts and percentages are by weight unless otherwise indicated.

EXAMPLE 1

A. Preparation of Unsaturated Polyether

A polyether monol of about 12,000 molecular weight is prepared by polymerizing propylene oxide and then ethylene oxide onto tripropylene glycol monobutyl ether. This monol contains about 87.5% polymerized propylene oxide.

The polyether monol (50 g) is dried under vacuum and mixed with an equimolar amount of 3-isopropenyl-α,α-dimethylbenzylisocyanate (TMI) and 6 microliters of dibutyltindilaurate. The resulting mixture is heated to 55° C. for two hours. The product is essentially entirely a capped polyether having terminal ethylenic unsaturation.

B. Preparation of Stabilizer Copolymer 5 mL of styrene (0.0436 mole) and 2.841 g of the unsaturated polyether of part A are mixed into 8.4 mL o-xylene, 0.00746 g of azobisisobutyrylnitrile (AIBN, 4.54×$10^{-5}$ mol) and 0.01065 g (6.82×$10^{-5}$ mol) of 2,2,6,6-tetramethylpiperidine 1-oxyl (TEMPO) in a Schlenk flask. The mixture is subjected to three freeze/thaw cycles to remove oxygen. The flask is then heated to 135° C. for 24 hours. 0.16 mL 1-dodecanethiol (6.82×$10^{-4}$ mol) is then added under a flux of nitrogen, and after five minutes the flask is quenched by immersing it in ice. The resulting product is purified by precipitating it in cold methanol. Styrene conversion is 68.2%. $M_n$ is 49,700 and polydispersity index (PDI) is 1.29. This stabilizer copolymer has a random structure as shown in FIG. 2.

EXAMPLE 2

A hexafunctional, 12,000 molecular weight ethylene oxide-capped polypropylene oxide is capped with TMI by reacting the starting materials at a 1:0.33 molar ratio in the presence of a tin catalyst in the same general manner described in Example 1A.

8.998 g of the resulting capped polyether, 7.5 mL of styrene (6.55×$10^{-2}$ mol), 10 mL of o-xylene, 0.00560 g of AIBN (3.41×$10^{-5}$ mol) and 0.02006 g of N-tert-butyl-1-diethylphosphone-2,2-dimethylpropyl nitroxyl (SG1, 6.82×$10^{-2}$ mol) are mixed in a Schlenk flask. The mixture is subjected to three freeze/thaw cycles to remove oxygen. The flask is then heated to 120° C. for 24 hours. 0.16 mL 1-dodecanethiol (6.82×$10^{-4}$ mol) is then added under a flux of nitrogen, and after five minutes the flask is quenched by immersing it in ice. Residual solvent and unreacted styrene are removed under vacuum at 85° C. Styrene conversion is 60.6%. $M_n$ is 74,700 and polydispersity index (PDI) is 1.52. This stabilizer copolymer has a random structure as shown in FIG. 1, with a calculated average of about 4 pendant branched polyether groups per molecule.

EXAMPLE 3

A. Preparation of Living Polystyrene Macroinitiator 15 mL of styrene (0.131 mol), 0.00764 g AIBN (4.52×$10^{-5}$ mol) and 0.01102 g TEMPO are mixed in a Schlenk flask. Oxygen is removed by subjecting the mixture to three freeze/thaw cycles. The flask is heated to 125° C. for 5 hours, after which time the flask is immersed in ice to quench the reaction. The resulting polystyrene is precipitated in cold methanol, filtered off, dissolved in tetrahydrofuran, precipitated again in cold methanol and filtered off again. The polystyrene is then dried at 40° C. for 72 hours under vacuum. The resulting polystyrene has an $M_n$ of 66,300 g/mol and a PDI of 1.26. Styrene conversion is 40.1%.

B. Preparation of Unsaturated Polyether

An unsaturated polyether is made in the same manner described in Example 1A, except the polyether monol has a molecular weight of only 4000.

C. Preparation of "Toothbrush" Stabilizer Copolymer 1 g of the polystyrene from part A above and 1.5 g of the unsaturated polyether from part B above are dissolved in 2 mL of o-xylene in a Schlenk flask. Oxygen is removed by subjecting the mixture to three freeze/thaw cycles. The flask is heated to 135° C. for 4 hours, after which time the flask is immersed in ice to quench the reaction. Residual solvent and unreacted styrene are removed under vacuum at 85° C. $M_n$ is 85,700 and polydispersity index (PDI) is 1.36. This stabilizer copolymer has a structure as shown in FIG. 3, with a calculated average of about 4 pendant linear polyether groups per molecule.

EXAMPLE 4

A. Preparation of Unsaturated Polyether 30.815 g of a 4000 molecular weight polyether monol prepared by adding ethylene oxide and then propylene oxide onto tripropylene glycol monobutyl ether is dried and dissolved in 30 mL of dry toluene. 0.6163 g (2.57×$10^{-2}$ mol) of sodium hydride is added at 0° C. The mixture is stirred and turns orange as the temperature allowed to rise to 25° C. 4-vinylbenzylchloride (0.8 moles per mole of monol) is added and the mixture stirred overnight at 25° C. Ethanol is added to neutralize unreacted sodium hydride. Toluene and ethanol are then removed under vacuum. The recovered product is dissolved in methylene chloride. Sodium chloride precipitates and is removed by filtering over silica gel. The product is then dried under vacuum. About 50 mol-% of the starting monol is capped with vinylbenzyl groups. The mixture therefore is approximately a 50/50 mixture of capped and uncapped polyethers.

B. Preparation of "Palm Tree" Stabilizer 1.5 g of the living polystyrene macroinitiator from Example 3A, and 3 g of the unsaturated polyether from Example 4A are dissolved in 6 mL of o-xylene in a Schlenk flask. The flask is heated to 135° C. for 15 hours, after which time 0.05 mL of 1-dodecanethiol (2.26×$10^{-4}$ mol) are added. After 5 minutes, the flask is immersed in ice to quench the reaction. Residual solvent and unreacted styrene are removed under vacuum at 85° C. $M_n$ is 84,500 and polydispersity index (PDI) is 1.32. This stabilizer copolymer has a structure as shown in FIG. 4, with a calculated average of about 5 pendant linear polyether groups per molecule.

EXAMPLE 5

A. Preparation of Living Polystyrene Macroinitiator 45 mL of styrene (0.393 mol), 0.03359 g AIBN (2.05×$10^{-4}$ mol) and 0.15050 g SG1 (5.12×$10^{-2}$ mol) are mixed in a Schlenk flask. Oxygen is removed by subjecting the mixture to three freeze/thaw cycles. The flask is heated to 120° C. for 5 hours, after which time the flask is immersed in ice to quench the reaction. The resulting polystyrene is precipitated in cold methanol, filtered off, dissolved in tetrahydrofuran, precipitated again in cold methanol and filtered off again. The polystyrene is then dried at 40° C. for 72 hours under vacuum. The resulting polystyrene has an $M_n$ of 50,000 g/mol and a PDI of 1.18. Styrene conversion is 45.2%.

B. Preparation of "Palm Tree" Stabilizer 1.5 g of the living polystyrene macroinitiator from Example 5A and 3 g of the unsaturated polyether from Example 4A are dissolved in 6 mL of o-xylene in a Schlenk flask. The flask is heated to 120° C. for 15 hours, after which time 0.07 mL of 1-dodecanethiol ($3 \times 10^{-4}$ mol) are added. After 5 minutes, the flask is immersed in ice to quench the reaction. Residual solvent and unreacted styrene are removed under vacuum at 85° C. $M_n$ is 83,000 and polydispersity index (PDI) is 1.37. This stabilizer copolymer has a structure as shown in FIG. 4, with a calculated average of about 9 pendant linear polyether groups per molecule.

EXAMPLE 6

A stabilizer copolymer is made in the general manner described in Example 5, this time using the alkoxyamine MAMA-SG1 as the free radical initiator/source of nitroxide radicals. Styrene is polymerized to a molecular weight of 21,500 g/mol to form a macroinitiator, and the unsaturated polyether from Example 4A is then polymerized onto the polystyrene macroinitiator. Approximately four polyether chains are incorporated into the copolymer, on average, to form a "palm tree" structure.

COMPARATIVE SAMPLE A

A comparative stabilizer is made in the same general manner as Example 2, but without using any nitroxide radical in the polymerization reaction. The resulting product contains only about 32% by weight of copolymer molecules that have pendant polyether groups. The number average molecular weight of these copolymer molecules is about 89,000, with a wide polydispersity. About 64% of the material obtained is unreacted unsaturated polyether and about 5% is a polystyrene homopolymer having a molecular weight of less than 30,000.

COMPARATIVE SAMPLES B AND C AND EXAMPLE 7

To prepare Comparative Sample B, a 12,000 molecular weight unsaturated polyether is prepared as described in Example 1A. This polyether is functionalized with 1-[1-(4-chloromethylphenyl)ethoxyl]-2,2,6,6-tetramethylpiperidine, and styrene is polymerized onto it to form an 8,000 molecular weight polystyrene block.

To prepare Comparative Sample C, a 2000 molecular weight linear unsaturated polyether is prepared and functionalized with 1-[1-(4-chloromethylphenyl)ethoxyl]-2,2,6,6-tetramethylpiperidine. Styrene is polymerized onto it to form a 3,000 molecular weight polystyrene block.

Example 7 is prepared in the same manner as Comparative Sample B, except the polystyrene block has a weight of 18,000 g/mole.

EVALUATIONS OF EXAMPLES 1-7 AND COMPARATIVE SAMPLES A-C

Dispersions are made using the products of each of Examples 1-7 and Comparative Samples A-C as the stabilizer. A mechanical dispersion process is performed in a three-neck flask equipped with a thermocouple, nitrogen connection and mechanical stirring (45 degree, 2-blade type stirrer). 15 g of a polyether polyol and 1 g (in the case of Examples 1-3, 6 and 7 and Comparative Samples A-C) or 1.5 g (in the case of Examples 4 and 5) of stabilizer are mixed and heated to 195° C. for 20 minutes with stirring under nitrogen. 4 g of polystyrene is added and the resulting mixture is stirred at 195° C. for 45 minutes. The mixture is cooled to below 60° C. with stirring to solidify the dispersed polystyrene particles. The viscosity of each dispersion is at 25° C. according to ISO 3219. Particle size is measured according to ASTM D1921. Results are as indicated in Table 1 below.

TABLE 1

| Stabilizer Copolymer | Stabilizer Structure | Dispersion Viscosity, 100 $s^{-1}$ (mPa · s) | Mean particle diameter (μm) |
|---|---|---|---|
| Comparative A | FIG. 1* | 2050 | 7.15 |
| Example 1 | FIG. 2 | 1590 | 6.54 |
| Example 2 | FIG. 1 | 1690 | 4.86 |
| Example 3 | FIG. 3 ("toothbrush") | 1100 | 16.46 |
| Example 4 | FIG. 4 ("palm tree") | 1450 | 5.58 |
| Example 5 | FIG. 4 ("palm tree") | 1360 | 4.57 |
| Example 6 | FIG. 4 ("palm tree") | 1560 | 4.64 |
| Comparative B | Block copolymer | Failed | Failed |
| Comparative C | Block copolymer | Failed | Failed |
| Example 7 | Block copolymer | 2030 | 3.65 |

*This structure constitutes only a small portion of the overall stabilizer in this case.

In all of Examples 1-6, the viscosity of the dispersion is much lower than in the control (Comparative A). In all cases except Example 3, the particle size of the dispersed polystyrene phase is smaller than in the control. Of particular interest is the contrast between Example 2 and Comparative Example A. The structure of the stabilizer copolymer is nominally the same in these two cases, but in Example 2, much more of the starting unsaturated polyether becomes polymerized and the resulting stabilizer is much more effective (as indicated by both smaller particles and lower viscosity).

Examples 3-6 show the benefits of the toothbrush and palm tree structures. The toothbrush structure produces an extremely low viscosity. The palm tree structure produces both a very low viscosity and low particle size.

Example 7 and Comparative Samples B and C show the effects of molecular weight in a linear block copolymer structure. The low molecular weights of Comparative Samples B and C lead to inadequate stabilization. Rather than becoming dispersed, the polystyrene forms macroscopic chunks when Comparative Samples B and C are used to stabilize the dispersion. Example 7 shows that adequate stabilization can be achieved, even in a block copolymer structure, if the block copolymer is formed in a controlled radical polymerization and the molecular weight of the polystyrene segment and of the stabilizer as a whole is adequate. The viscosity at 100 $s^{-1}$ shear rate is essentially the same as Comparative Sample A (although particle size is smaller), due to the low molecular weight and linear structure of the stabilizer. Higher stabilizer molecular weight is expected to lead to decreases in the dispersion viscosity.

EXAMPLE 8

18.3 mg (5.02×10⁻⁵ mol) of S-1-dodecyl-S'-(α,α'-dimethyl-α"-acetic acid)trithiocarbonate and 5.5 mL (4.80×10⁻² mol) of styrene are introduced into a two-neck round-bottom flask equipped with septum, nitrogen connection and magnetic stirring. Nitrogen is bubbled through for 30 minutes to remove oxygen. The flask is then heated for 3 hours at 120° C. Then, 5.85 g (1.5×10⁻⁴ mol) of a degassed TMI-capped hexafunctional, 12,000 molecular weight ethylene oxide-capped polypropylene oxide as described in Example 2 is added. The reaction is continued at 120° C. overnight, to form a white solid. The solid is dissolved in tetrahydrofuran and precipitated in cold methanol. The resulting product is then dried under vacuum. On GPC, the product exhibits a wide molecular weight distribution (polydispersity index 5.0). On average, the stabilizer has a "palm-tree" type structure that contains about 3 branched polyether groups per molecule. The product has polystyrene blocks that on average have molecular weights of 20,000 g/mole.

A dispersion is made with this stabilizer, using the same process described with regard to the earlier examples. The polystyrene disperses well into the polyol, to produce spherical, non-agglomerated particles that have a peak particle diameter of about 2.5 μm. The viscosity of the dispersion is 1590 mPa·s (25° C., 100 s⁻¹).

What is claimed is:
1. A process for making a polymer polyol, comprising
   1) producing a copolymerization product by a) first polymerizing one or more low molecular weight unsaturated monomers in a nitroxide-mediated or reversible addition-fragmentation chemical transfer (RAFT) polymerization to form a living polymeric macroinitiator having a molecular weight of at least 18,000 and up to 400,000 and then b) copolymerizing the living polymeric macroinitiator formed in step a) with an unsaturated polyether which has a molecular weight from 2000 to 20,000 and from 0.2 to 1 polymerizable unsaturated groups per molecule, or a mixture of the unsaturated polyether and one or more additional low molecular weight monomers and then
   2) forming a dispersion of solid polymer particles in the presence of a continuous liquid polyol phase and the copolymerization product produced in step 1).
2. The process of claim 1, wherein the copolymerization of step 1) is performed in the presence of a nitroxide radical having the structure:

wherein each R¹ group is independently an alkyl or substituted alkyl group provided that the R¹ groups together may form an aliphatic ring structure that includes the nitrogen atom within the aliphatic ring structure.
3. The process of claim 2, wherein the copolymerization of step 1) is performed in the presence of a nitroxide radical having one or more of the following structures:

tempo

SG1

2,2,5-trimethyl-4-phenyl-3-azahexane-3-nitroxide and a separate free radical initiator.
4. The process of claim 1, wherein the copolymerization of step a) is performed in the presence of an alkoxyamine.
5. The process of claim 1, wherein the copolymerization product is a block copolymer including a first block having a molecular weight of at least 18,000 that is devoid of pendant polyether groups and a second block which is a homopolymer of an unsaturated polyether which has a molecular weight from 2000 to 20,000 and from 0.2 to 1.0 polymerizable unsaturated groups per molecule or a copolymer of said unsaturated polyether with one or more copolymerizable low molecular weight unsaturated monomers, the second block containing from 2 to 20 pendant polyether groups that each have a molecular weight from 2000 to 20,000.
6. The process of claim 5, wherein the pendant polyether groups are linear.
7. The process of claim 5, wherein at least some of the pendant polyether groups are branched.
8. The process of claim 5 wherein the first block is polystyrene.
9. The process of claim 1, wherein the solid polymer particles are a thermoplastic that does not melt, soften or thermally degrade at a temperature of 80° C. or less.
10. The process of claim 9, wherein the solid polymer particles are a homopolymer or copolymer of styrene.
11. The process of claim 1, wherein the liquid polyol phase includes a polyether polyol.
12. The process of claim 11, wherein the polyether polyol is a poly(propylene oxide) homopolymer, random copolymer of propylene oxide and ethylene oxide in which the poly(ethylene oxide) content is from about 1 to about 30% by weight; an ethylene oxide-capped poly(propylene oxide) polymers or an ethylene oxide-capped random copolymers of propylene oxide and ethylene oxide, wherein the polyether polyol contains an average of 1.8 to 8 hydroxyl groups/molecule, has an equivalent weight from 400 to 3000.
13. The process of claim 1 wherein step 2) includes the steps of (a) mixing a melted thermoplastic polymer with the liquid polyol in the presence of the copolymerization product of step 1) under conditions sufficient to disperse the melted thermoplastic polymer in the form of droplets within a continuous phase of the liquid polyol and (b) cooling the dispersed polymer droplets in the polyol to solidify the polymer droplets and form the polymer polyol.

14. The process of claim 1 wherein step 2) includes an in situ polymerization process which includes the steps of polymerizing one or more low molecular weight monomers in the presence of the continuous polyol phase and in the presence of the copolymerization product under conditions such that the low molecular weight monomer(s) polymerize to form polymer particles dispersed in the continuous polyol phase.

* * * * *